US005865063A

United States Patent [19]
Sheldon

[11] Patent Number: 5,865,063
[45] Date of Patent: *Feb. 2, 1999

[54] THREE-AXIS MACHINE STRUCTURE THAT PREVENTS ROTATIONAL MOVEMENT

[75] Inventor: Paul C. Sheldon, Mequon, Wis.

[73] Assignee: Sheldon/Van Someren, Inc., Wauwatosa, Wis.

[*] Notice: The term of this patent shall not extend beyond the expiration date of Pat. No. 5,787,758.

[21] Appl. No.: 747,330

[22] Filed: Nov. 12, 1996

Related U.S. Application Data

[63] Continuation-in-part of Ser. No. 707,125, Sep. 3, 1996.
[51] Int. Cl.[6] ...................................................... B25J 11/00
[52] U.S. Cl. ...................... 74/490.01; 248/653; 248/654; 414/917; 901/22; 901/23
[58] Field of Search ......................... 74/490.01, 490.03, 74/490.04, 490.07; 248/631, 653, 654; 408/234; 409/145, 201, 216, 235, 241; 901/22, 23; 414/917

[56] References Cited

U.S. PATENT DOCUMENTS

| | | |
|---|---|---|
| 4,762,459 | 8/1988 | Morita et al. ......................... 901/22 X |
| 4,806,068 | 2/1989 | Kohli et al. ........................... 901/22 X |
| 5,028,180 | 7/1991 | Sheldon et al. ...................... 901/22 X |
| 5,388,935 | 2/1995 | Sheldon ................................... 409/201 |

FOREIGN PATENT DOCUMENTS

| | | | |
|---|---|---|---|
| 1 296 401 | 3/1987 | U.S.S.R. | ................................. 901/22 |
| 1 505 773 | 9/1989 | U.S.S.R. | ................................. 901/22 |

OTHER PUBLICATIONS

Jean–Pierre Merlet, published on the Internet at http://www.inria. fr/prisme/personnel/merlet/merlet eng. html, § Parallel manipulators, drawing and references for Manipulateurs a 3 degres de liberte.

Primary Examiner—Allan D. Herrmann
Attorney, Agent, or Firm—Robert A. Van Someren

[57] ABSTRACT

A three-axis machine control structure includes a support structure and a machine component to which a workpiece or tool can be attached. Three control arms are connected between the machine component and the support structure. Preferably, each control arm is pivotably connected to the support structure and to the machine component and includes a pair of four-bar linkages connected in series. The control arms are oriented to permit rapid movement of the machine component along any or all of the three linear axes, while restricting movement of the machine component along the rotational axes.

20 Claims, 9 Drawing Sheets

THREE-AXIS MACHINE STRUCTURE THAT PREVENTS ROTATIONAL MOVEMENT

This is a continuation-in-part of the patent application entitled "Three-Axis Machine For Rapid And Rigid Manipulation Of Components", Ser. No 08/707,125, filed on Sep. 3, 1996.

FIELD OF THE INVENTION

The present invention relates generally to machines for moving objects through space, and particularly to a three-axis machine for rapidly and rigidly moving objects through space while restricting rotational movement of the object.

BACKGROUND OF THE INVENTION

Generally, an object can be moved through space with six degrees of freedom. In other words, the object can be moved along six different axes, three of which are linear axes, and three of which are rotational axes. The three linear axis are commonly known as the x-axis, y-axis and z-axis. An object's movement through space from one point to another can be tracked along the three linear axes, x, y and z. However, that same object can twist, i.e. pivot or rotate, about each of the linear axes. Thus, there are three rotational degrees of freedom that are commonly represented by three rotational axes, referred to as the a-axis, b-axis and c-axis. The rotational axes sometimes also are known as roll, pitch and yaw.

It should be noted that rotational movement or rotational degrees of freedom of movement of the object are understood as rotation of the object about the linear axes, x, y, z extending through the object. Reference to the restriction of rotational movement of the object does not imply that the object cannot be moved along arcuate or circular paths from one point to another in space. Such arcuate or circular travel can be defined solely as movement along the three linear axes if no twisting of the object occurs.

Depending on the requisite manipulation of an object, machines are designed to move various objects through space with one to six degrees of freedom. For example, machine tools used for milling, drilling, and grinding workpieces are sometimes designed to manipulate an object, e.g. a cutting tool, along all six axes. However, many applications only require the object be moved with the three degrees of freedom defined by the three linear axes. In fact, in both situations, it often is undesirable to allow any twisting or rotational movement of the object, e.g. tool, because this can lead to poorly formed parts that do not meet modem tolerance requirements. This is particularly true with machines that generate substantial force loads, such as loads that occur during milling or drilling operations.

To combat the undesirable twisting and to maintain operational accuracy and precision, many three-axis machines use large cast components that move along precisely ground ways. The large, cast components reduce twisting of the object being moved, e.g., a spindle head for a drill or milling cutter. Simultaneously, the ways guide the heavy cast machine structures as they are moved along the x, y and z axes. Typically, such a machine includes a separate machine structure and a separate way or ways for each axis of movement. This leads to increased time and expense in building and maintaining the machine. Additionally, because of the mass of the solid machine structures, these machines are relatively slow in moving an object from one point to another.

The present invention addresses the foregoing drawbacks of existing three-axis machines.

SUMMARY OF THE INVENTION

The present invention features a three-axis control structure that permits an object to move through space along the three linear axes while restricting motion of the object along the rotational axes. The three-axis control structure includes a support structure and a machine component configured to carry the object. A rotational control system is connected between the support structure and the machine component and includes three control arms. Each control arm has a pair of four-bar linkages connected in series. The control arms are connected such that the rotational control system restricts movement of the machine component along the three rotational axes relative to the support structure.

According to more detailed aspects of the invention, each control arm is pivotably attached to the support structure and to the machine component. In one embodiment, the control arms are each connected to the machine component for pivotable motion about a corresponding axis. The three corresponding axes all lie parallel to a first common plane. In this embodiment, each control arm is also pivotably attached to the support structure for pivotable motion about another corresponding axis. These corresponding axes also lie parallel to a common plane. The specific arrangement and combination of the control arms allows the machine component to freely move through space along the three linear axes without twisting along the rotational axes. Thus, the three-axis control structure is particularly useful in machines, such as powered machine tools, in which twisting motion of the machine component is detrimental to the machining operation.

BRIEF DESCRIPTION OF THE DRAWINGS

The invention will hereafter be described with reference to the accompanying drawings, where like reference numerals denote like elements, and.

DETAILED DESCRIPTION OF THE PREFERRED EMBODIMENTS

Figures 1, 2, 2A:
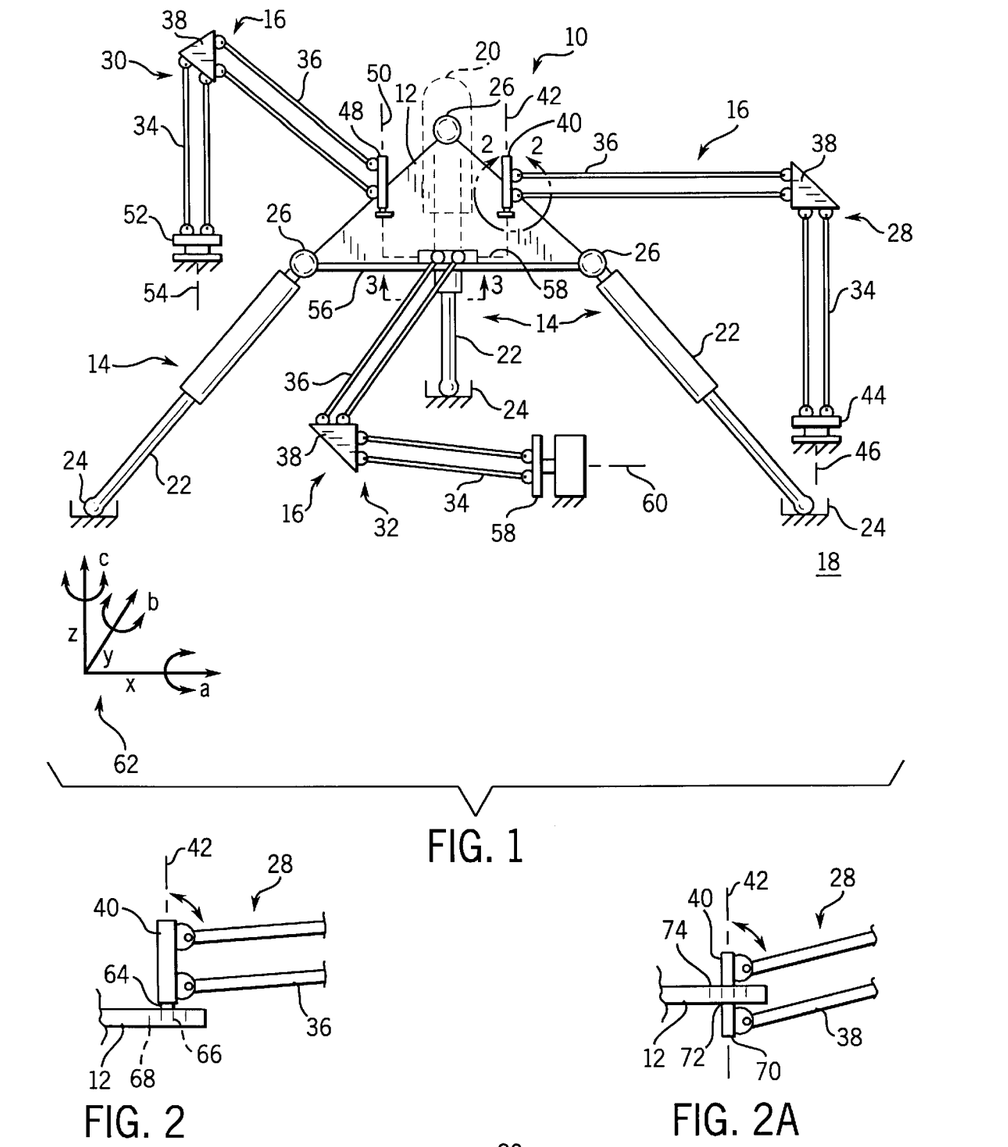
FIG. 1 is a perspective view of a machine according to a preferred embodiment of the present invention.
FIG. 2 is an enlarged partial view of FIG. 1 taken generally along line 2—2 illustrating attachment of a control arm to the machine component.
FIG. 2A is an alternate embodiment of the connection shown in FIG. 2.

Referring generally to FIG. 1, a machine 10, according to a preferred embodiment of the invention, is illustrated. Machine 10 includes a machine component 12, an actuator 14 and a rotational control system 16. Actuator 14 and rotational control system 16 are attached to a support structure 18, illustrated in FIG. 1 as a floor. However support structure 18 can be any of a variety of support structures including floors, base plates, larger machine structures, overhead structures or any combination of support structures. Additionally, machine 10 can be mounted to extend above a horizontal support structure, to suspend from a support structure or to extend sideways from a vertical or angled support structure.

Machine component 12 can be made in a wide variety of forms and configurations, depending on the particular application of machine 10. For example, machine component 12 can be designed to carry various objects, including workpieces, reflective or other optical surfaces, parts and tools, such as spindles for drilling, boring, milling or grinding operations, or sensors such as touch probes. An exemplary object 20 is illustrated in FIG. 1.

Actuator 14 is designed to move machine component 12 with respect to support structure 18 and preferably includes three actuator legs 22. Actuator legs 22 are illustrated as extensible legs, but also can be hinged legs that fold inwardly and outwardly to move machine component 12. A variety of extensible actuator legs can be used depending on the application, and can include hydraulic actuators or servostruts, such as linear motor actuators or ball screw actuators. The desired extension and retraction of each actuator leg 22 would typically be controlled by, for instance, a machine controller (not shown), to move object 22 along a desired path. It also should be noted that the position of each actuator leg can be sensed by a variety of sensors known in the machine tool industry and described in the prior art. For example, some ball screw actuators include a sensor, e.g. a resolver or encoder, that tracks the extension and indicates the position of the actuator. Also, a sensing head and magnetic scale could be incorporated into each actuator leg to indicate position by tracking the extension and retraction of each leg.

Each actuator leg 22 is designed for pivotable connection to support structure 18 by a pivot mount 24, such as a ball and socket or universal joint. Pivot mounts 24 provide each actuator leg with at least two degrees of freedom to permit movement of object 20 along the x, y and z axes. Similarly, each actuator leg 22 is pivotably connected to machine component 12 by a machine component pivot mount 26 as illustrated in FIG. 1. Each machine component pivot mount 26 should also provide the actuator leg 22 with at least two degrees of freedom of movement to permit movement of the machine component along any combination of the three linear axes. An exemplary machine component pivot mount 26 is also a ball and socket pivot or universal joint.

In the embodiment illustrated in FIG. 1, rotational control system 16 includes three control arms 28, 30 and 32. Preferably, each of the control arms 28, 30 and 32 includes a first four-bar linkage 34 and a second four-bar linkage 36 connected in series by an attachment bracket 38.

Control arm 28 includes a first end 40 pivotably mounted to machine component 12 for rotational movement with a single degree of freedom about an axis 42. Control arm 28 also includes a second end 44 pivotably mounted to support structure 18 for rotational motion with one degree of freedom about an axis 46. Similarly, control arm 30 includes a first end 48 pivotably mounted to machine component 12 for rotation with one degree of freedom about an axis 50. Control arm 30 also includes a second end 52 pivotably mounted to support structure 18 for rotational movement with one degree of freedom about an axis 54. It is preferred that axes 42, 46, 50 and 54 be oriented substantially parallel to one another. Further, control arm 32 includes a first end 56 pivotably mounted to machine component 12 for rotational movement with one degree of freedom about an axis 58. Control arm 32 also includes a second end 58 pivotably mounted to support structure 18 for rotational movement with one degree of freedom about an axis 60. As illustrated, axis 58 is oriented in a transverse direction with respect to axis 42 and 50. It is preferred that axes 58 and 60 of control arm 32 be substantially parallel.

With reference to a diagram 62, the motion of machine 10 can be explained more fully. Machine component 12 and attached object 20 are moved through space by selective actuation of each actuator leg 22. However, during this movement, control arms 28, 30 and 32 cooperate to prevent any rotational movement of machine component 12. In other words, machine component 12 can be moved through space with three degrees of freedom defined by linear axes x, y and z. However, control arms 28, 30 and 32 prevent twisting, i.e. rotational movement of machine component 12 along rotational axes a, b and c. Specifically, control arms 28 and 30 extend from machine component 12 at an angle with respect to one another to prevent rotational motion along both the a-axis and the b-axis. Control arm 32 is oriented to prevent movement along the c-axis. The unique arrangement and attachment of the four-bar linkages permits free and rapid movement of machine component 12 in three linear degrees of freedom while preventing movement of machine component 12 in the rotational degrees of freedom.

It should be noted that the specific design of control arms 28, 30 and 32 will vary depending on space constraints, support structure design, and application of machine 10. However, in an exemplary orientation of control arms 28 and 30, their second four-bar linkages 36 form an approximately 90 degree angle with one another when their second four-bar linkages lie in a common plane and machine component 12 is disposed at a generally central working location. Similarly, it may be advantageous to attach control arm 32 to support structure 18 at a location lying generally in a common plane with machine component 12 when machine component 12 is at a central working location. However, there is substantial latitude as to the location at which control arm 32 can be attached to support structure 18 without deprecating the functionality of machine 10.

Figure 3:
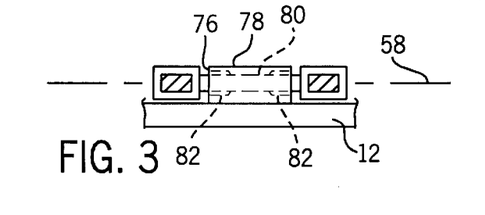
FIG. 3 is an enlarged partial view of FIG. 1 taken generally along line 3—3 illustrating attachment of a control arm to the machine component.
Figure 4:
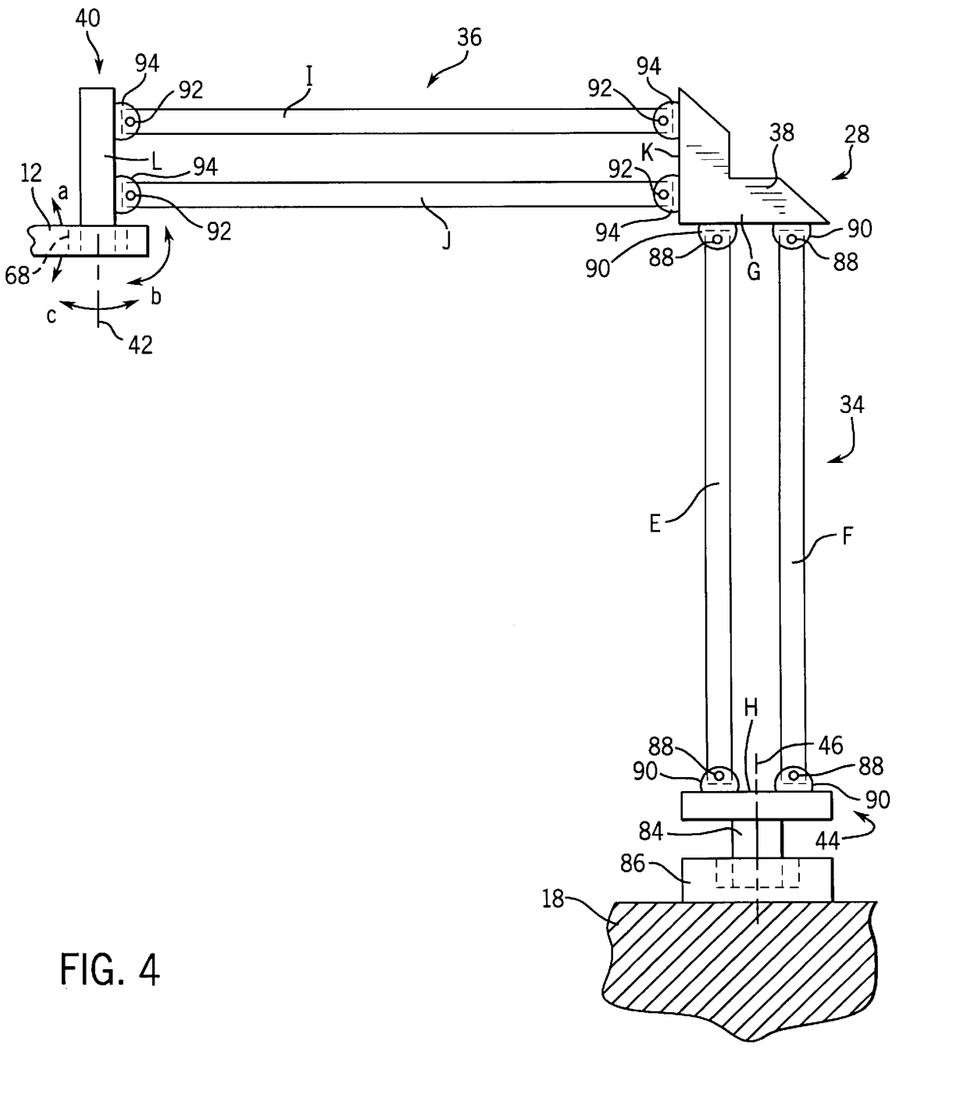
FIG. 4 is a side view of a control arm, according to a preferred embodiment of the present invention, connected between a support structure and the machine component.

Referring generally to FIGS. 2–4, the attachment of control arms 28, 30 and 32 to machine component 12 as well as the preferred structure of the control arms will be explained. As specifically illustrated in FIG. 2, first end 40 of control arm 28 can be rotatably mounted to machine component 12 such that the second four-bar linkage is disposed to one side of machine component 12. In this arrangement, first end 40 includes a pivot rod 64 extending from one end and received in an opening 66 formed in machine component 12. Preferably, pivot rod 64 is mounted in a bearing 68, such as a roller bearing or a pair of ball bearings, to facilitate a smooth pivoting motion of control arm 28 about axis 42.

In a second embodiment, illustrated in FIG. 2A, first end 40 comprises a pin 70 received through an opening 72 in machine component 12. In this embodiment, the second four bar linkage 36 is disposed partially on both sides of machine component 12, as illustrated. Pin 70 is mounted in a bearing 74, such as a roller bearing or a pair of ball bearings to facilitate pivoting of control arm 28 about axis 42. First end 48 of control arm 30 also can be mounted to machine component 12 as illustrated in either FIG. 2 or FIG. 2A.

As illustrated in FIG. 3, first end 56 of control arm 32 can be connected to machine component 12 by a rod 76 pivotably mounted in a boss 78 having an opening 80 therethrough. Preferably, rod 76 is mounted in a bearing 82, such as a pair of ball bearings. This arrangement facilities pivotal motion of control arm 32 about axis 58.

The structure and function of each of the control arms can be explained with reference to a single control arm, specifically control arm 28 shown in FIG. 4. As explained above, control arm 28 is pivotably mounted to machine component 12 at first end 40 and to support structure 18 at second end 44. For example, second end 44 may include a pin 34 rotatably received by a mounting bracket 86 attached to support 18. As with the attachment of first end 40 to machine component 12, the structure for mounting second end 44 to support structure 18 can have a variety of forms, but should permit second end 44 only one degree of freedom of motion, i.e., rotation about axis 46.

The first four-bar linkage 34 and the second four-bar linkage 36 of control arm 28 cooperate to prevent movement of machine component 12 along rotational axis b. The other control arms, 30 and 32, cooperate with control arm 28 to restrict movement of machine component 12 along all three rotational axes.

First four-bar linkage 34 includes four bars labeled as E, F and G, H that are linked at four pivot points 88 by brackets 90. Bars E and F are parallel and of the same length. Thus, as attachment bracket 38 is moved with respect to second end 44, bars E and F remain parallel.

Similarly, second four-bar linkage 36 includes four bars labeled as I, J, and K, L that are connected at four pivot points 92 by brackets 94. Bars I and J are parallel and of the same length. Thus, as machine component 12 is moved with respect to attachment bracket 38, bars I and J remain parallel. Because bars E and F of first four-bar linkage 34 are parallel to each other and connected in series with the parallel bars I and J of second four-bar linkage 36, forces acting on machine component 12 that tend to twist it along the b-axis are translated to support structure 18 through bars I,J and E,F in either tension or compression. Control arm 28, therefore, provides great rigidity and resistance to twisting motion along the b-axis.

Preferably, brackets 90 and 94 are designed to hold bars E, F and I, J, respectively, to one degree of rotational freedom about their respective pivot points 88 and 92. In other words, bars, E,F and I, J remain substantially parallel with a common plane during movement.

Connecting first four-bar linkage 34, having parallel, equal-length bars E and F, with second four bar linkage 36, having parallel equal-length bars I and J, as illustrated, ensures that first end 40 and axis 42 always remain oriented in the same direction regardless of where machine component 12 is moved in three dimensional space. Thus, machine component 12 is restrained from any rotational motion, other than rotational motion about axis 42. Control arm 32, as illustrated in FIG. 1, is oriented to prevent rotational movement of machine component 12 about axis 42, i.e. along the rotational axis c. As noted, the orientation of control arm 28 and its four-bar linkages provides rigid resistance to rotation of machine component 12 along rotational axis b. It also provides resistance to torsional forces acting to rotate machine component 12 along rotational axis a. However, because the four-bar linkages provide far greater resistance to forces that act on the bars in tension or compression rather than torsionally, it is often necessary to connect control arm 30 to machine component 12 to fully resist rotation of the machine component along rotational axis a.

Bars E, F, and I, J could be replaced with bowed bars or bars of other configurations, but it is preferred that straight, parallel bars of equal length be used. This configuration provides control arm 28 with great structural rigidity against any movement of machine component 12 along rotational axis b. Similar analyses apply to control arm 30 in preventing rotation along the a-axis and to control arm 32 in preventing rotation along the c-axis.

Figure 5:
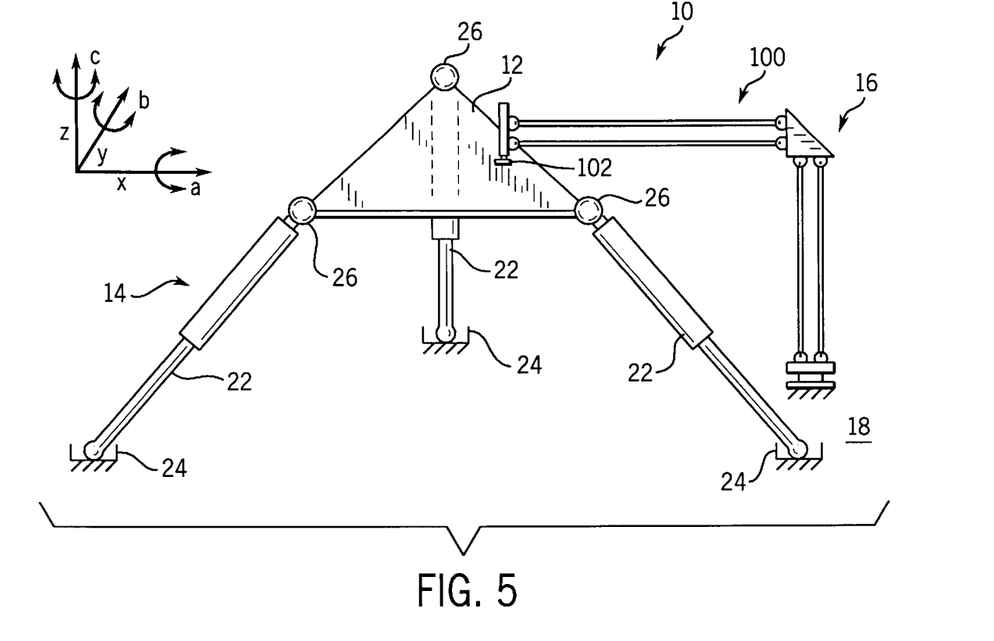
FIG. 5 is an alternate embodiment of the machine illustrated in FIG. 1.
Figure 6:
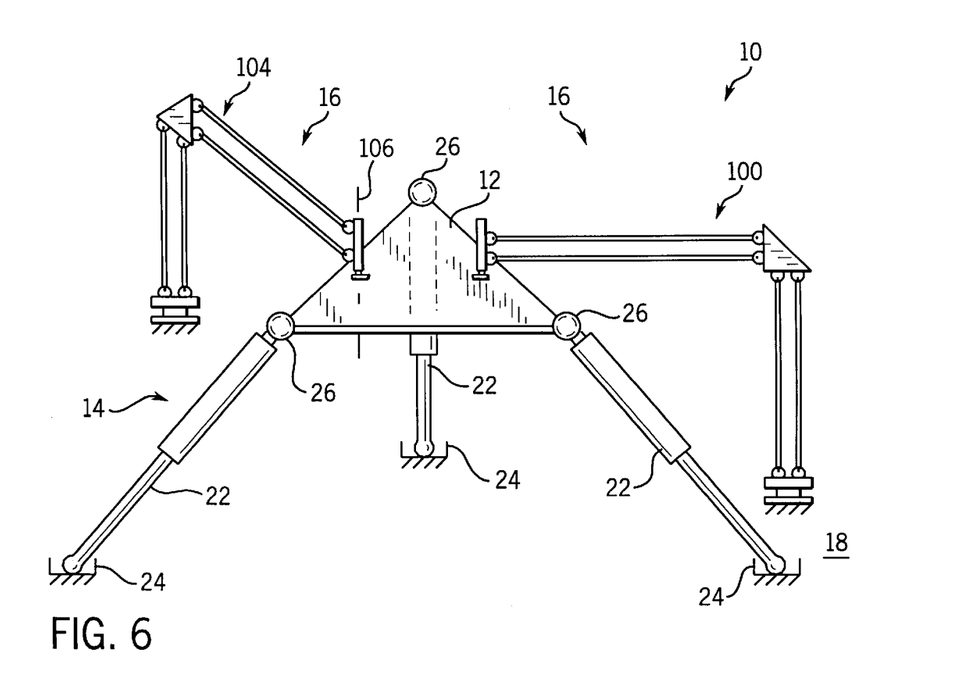
FIG. 6 is another alternate embodiment of the machine illustrated in FIG. 1.

As alluded to above, some applications of machine 10 may not require three control arms. Alternate embodiments of machine 10 are illustrated in FIGS. 5 and 6, where either one or two control arms are attached to machine component 12. Referring specifically to FIG. 5, a single control arm 100 is connected between support structure 18 and machine component 12. In this configuration, control arm 100 resists movement of machine component 12 along two rotational axes if it is rotationally attached to machine component 12 as described above with reference to FIGS. 1–4. However, if control arm 100 is rigidly affixed to machine component 12 at a location 102, then the control arm resists rotational movement of machine component 12 along all three rotational axes. This configuration, of course, provides the greatest rigidity with respect to forces that act through the four-bar linkages of control arm 100 solely in compression and tension (i.e., forces acting along rotational axis b) as described above with reference to FIG. 4.

If greater rigidity is required to combat twisting of machine component 12 along another rotational axis, a second control arm 104 can be added as illustrated in FIG. 6. In this embodiment, control arm 100 is rigidly affixed to machine component 12 and control arm 104 is rotatably mounted to machine component 12 for a single degree of freedom of rotation about an axis 106. This configuration will provide great resistance to rotation of machine component 12 along rotational axes a and b, because the parallel bars of control arms 100 and 104 are placed solely in tension or compression by forces acting along those axes. In certain applications, it may not be necessary to provide the greater rigidity against movement of machine component 12 along rotational axis c that otherwise would be afforded by a third control arm. For example, some tools have a rotating spindle for turning a cutter about the z-axis, and therefore it may be less essential to rigidly hold the tool against rotation along rotational axis c. It should also be noted that in the embodiments illustrated in FIGS. 5 and 6, there will be a slight translation of machine component 12 along the c-axis as it is moved along the xy plane due to its fixed attachment to control arm 100.

Figure 7:
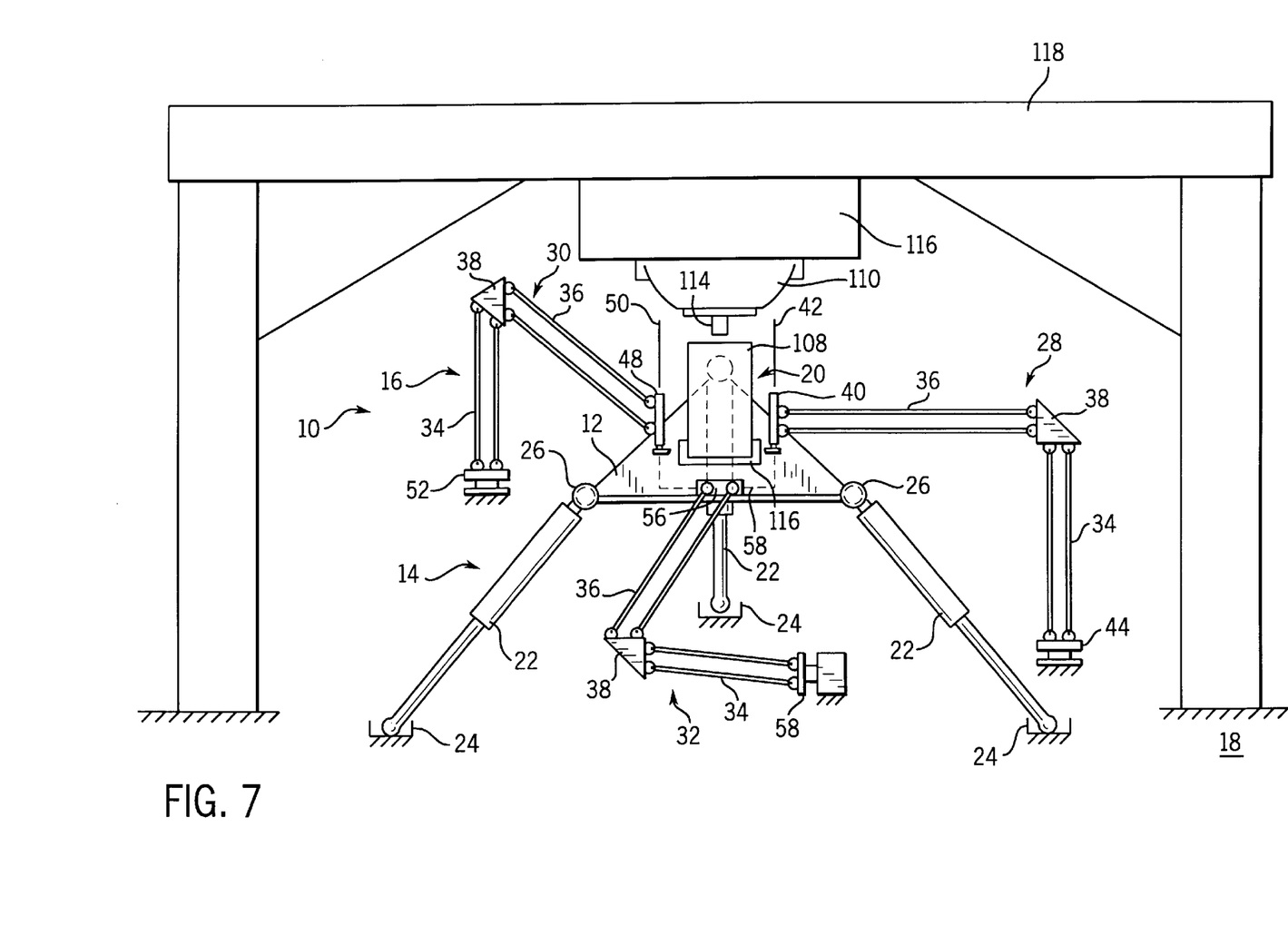
FIG. 7 illustrates one exemplary use of the machine of FIG. 1 in which a workpiece is moved to interact with a tool.

With reference to FIG. 7, an exemplary operation of machine 10, as illustrated in FIG. 1, can be described. An object 20 is carried by machine component 12 and includes a workpiece 108 disposed for cooperation with a tool 110. For example, workpiece 108 could be a metal part undergoing a milling operation by a milling cutter 114. Actuator 14 controls the movement of workpiece 108 with respect to tool 110 as various milling operations are performed on workpiece 108. Simultaneously, control arms 28, 30 and 32 restrict movement of machine component 12 along any of the rotational axes to ensure accurate and precise milling of workpiece 108.

In FIG. 7, workpiece 108 is mounted to a fixture 116 attached to machine component 12. However, tool 110 could be mounted below, and machine 10 could be suspended from overhead support structure 118. Alternatively, tool 110 could be mounted to machine component 12 to operate on a stationary workpiece.

Figure 8:
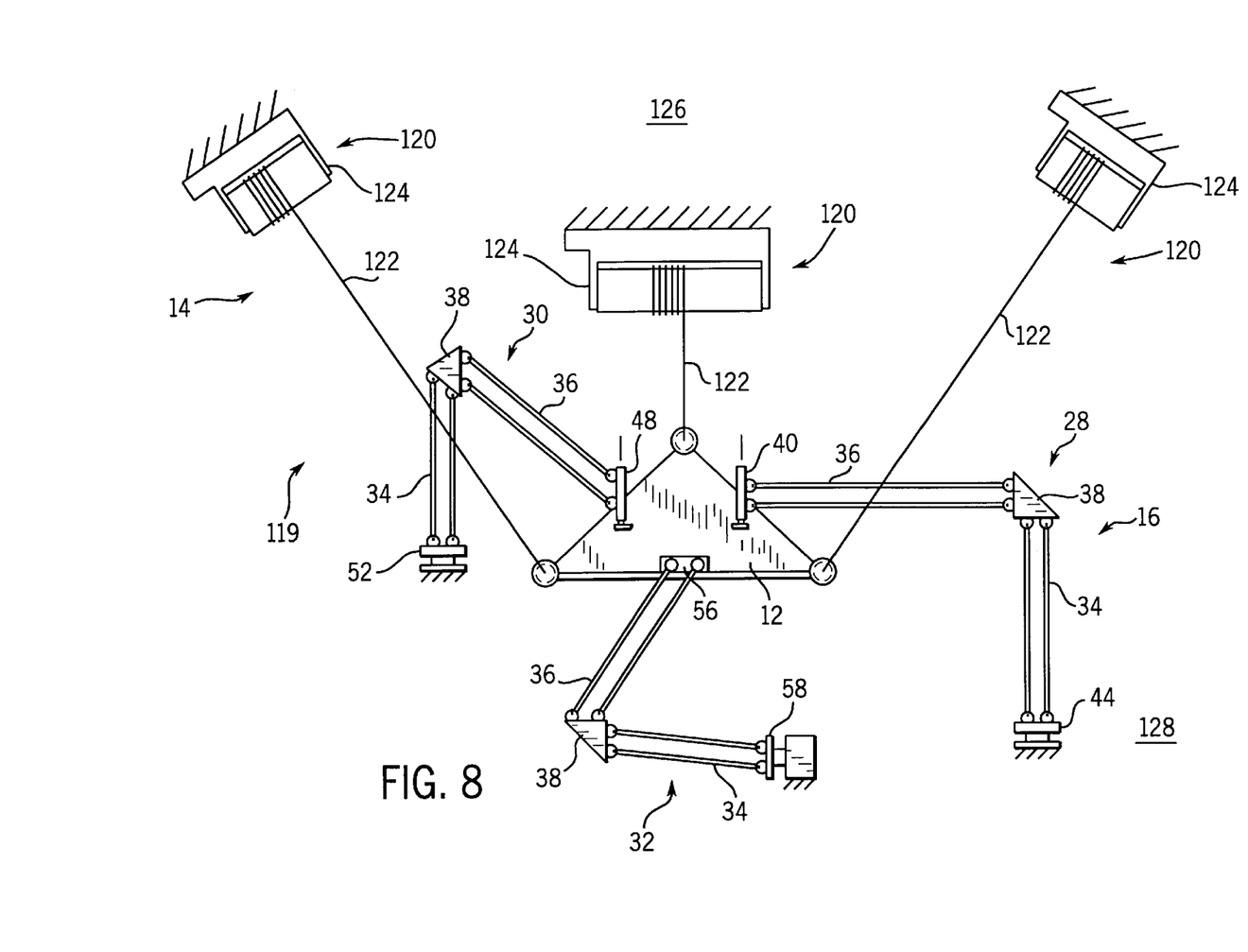
FIG. 8 is a perspective view of another embodiment of the present invention in which the machine component is suspended.

An alternate embodiment of the invention is illustrated in FIG. 8. In this embodiment, control arms 28, 30 and 32 are attached between support structure 18 and machine component 12 as described with reference to FIG. 1. However, the actuator legs 22 of FIG. 1 have been replaced with overhead actuators 120. Overhead actuators 120 include flexible members 122, such as cables, that support machine component 12 from above as illustrated. The lengths of flexible members 122 can be independently controlled to move machine component 12 along a desired path. Powered rollers 124, for instance, can be used to independently wind or unwind each flexible member 122, thereby adjusting the span of each flexible member between the corresponding powered roller and the machine component to move the machine component along a desired path. The weight of machine component 12 and any objects carried by machine component 12 maintains the tensile load on each flexible member 122 as it is unwound from powered roller 124. As described above, the use of one or more control arms such as control arms 28, 30 and 32, prevents undesired rotational movement of machine component 12 as it is moved through space by the flexible members.

In the embodiment illustrated in FIG. 8, powered rollers 124 are attached to an overhead support structure 126 while control arms 28, 30 and 32 are mounted to a lower support structure 128. Alternatively, both the powered rollers and the control arms could be mounted to overhead support structure 126, depending on space considerations and the particular application of machine 10.

An alternate embodiment of the machine described above is illustrated in FIGS. 9–9D. In this embodiment, the control arms are arranged in a slightly different configuration to eliminate or restrict rotational movement of a machine component relative to a support structure, while permitting movement along the three linear axes, x, y and z.

Figure 9:
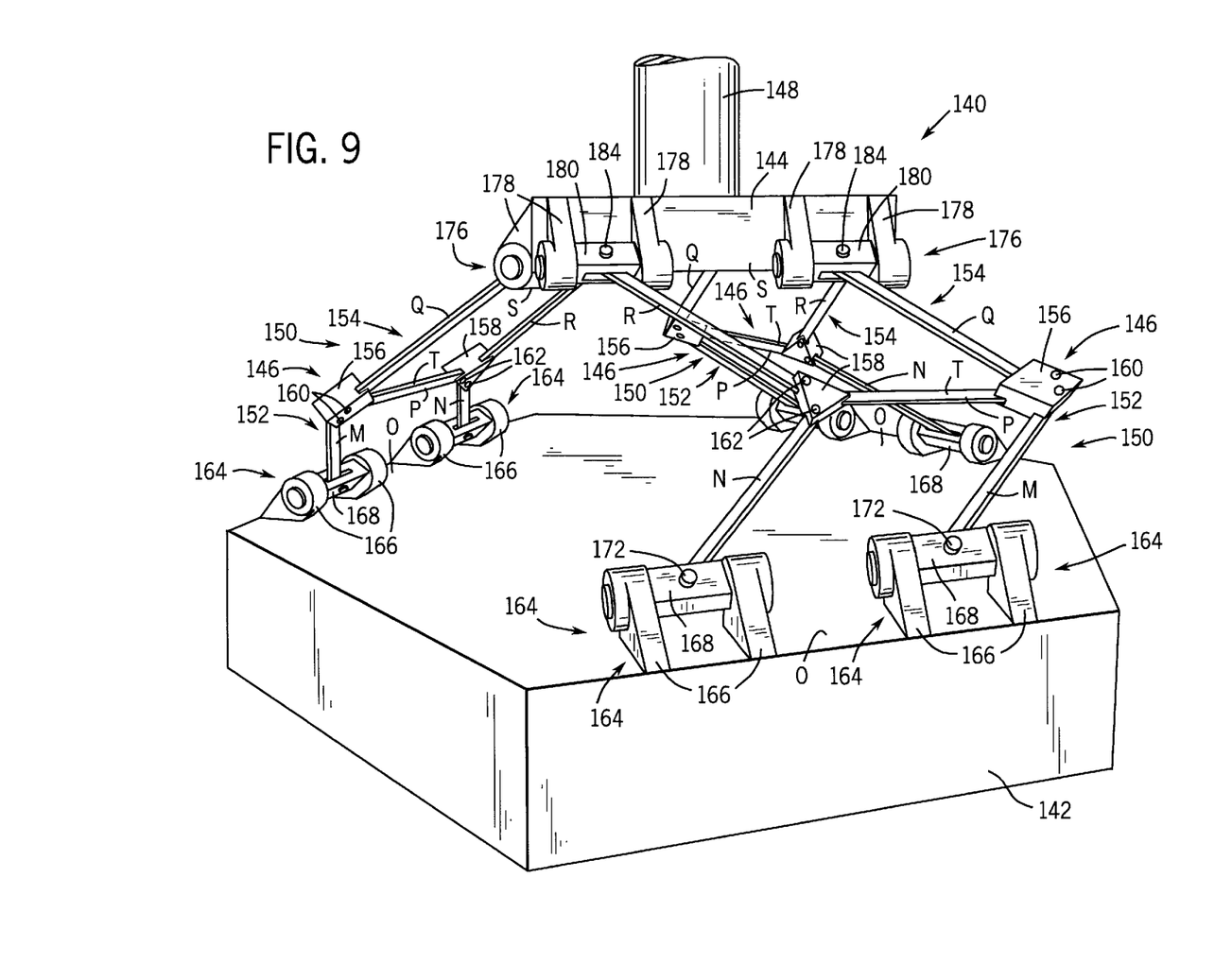
FIG. 9 is a perspective view of an alternate embodiment of the machine illustrated in FIG. 1.

In this embodiment, a three-axis control structure 140 includes a support structure 142 coupled to a machine component 144. A plurality of control arms, and preferably three control arms 146, connect support structure 142 to machine component 144 and restrict rotational movement of machine component 144 relative to support structure 142. An object 148, such as a rotary tool spindle or any of a variety of other objects, is mounted to machine component 144 for interaction with, for example, a workpiece (not shown).

Figure 9A:
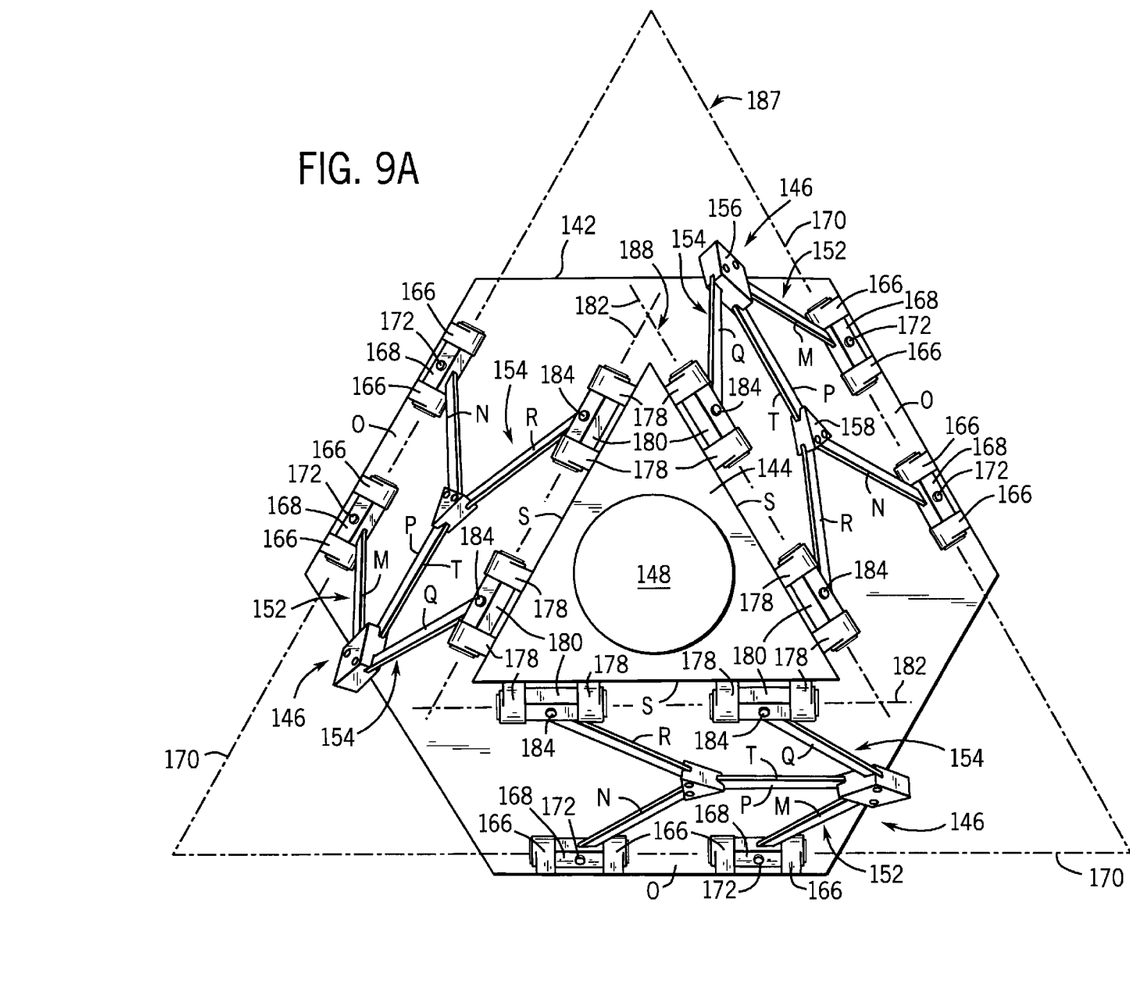
FIG. 9A is a top view of the embodiment illustrated in FIG. 9.

As illustrated best in FIGS. 9 and 9A, each control arm 146 includes a linkage assembly 150. Preferably, each linkage assembly 150 includes a first four-bar linkage 152 connected in series with a second four-bar linkage 154. As described above with reference to the embodiment illustrated in FIG. 1, each first four bar linkage 152 includes four links labeled as M, N, O, and P. Similarly, each second four bar linkage 154 includes four links labeled as Q R, S and T. It should be noted that in the embodiment illustrated, links T and P are integrally formed with the same structural member. Additionally, links O and S are, at least partially, integrally formed with support structure 142 and machine component 144, respectively. Alternatively, as illustrated in FIG. 9B, links O and S could be formed as a linear member separate from support structure 142 and and machine component 144.

First four-bar linkage 152 is connected to second four-bar linkage 154 by a pair of brackets 156 and 158. Links T and P are rigidly affixed to brackets 156 and 158. However, links M and Q are pivotably connected to bracket 156 at pivot points 160 for pivotable motion with one degree of freedom about each corresponding pivot point 160. Preferably, link Q pivots along a common plane with link M. Similarly, links N and R are pivotably connected to bracket 158 at pivot points 162 for pivotable motion with one degree of freedom. Preferably, links R and N pivot along the same common plane with links Q and M. In the illustrated embodiment, links R and N (as well as links Q and M) form an angle with one another that is oriented in the same manner for each control arm 146. This angle, however, can be oriented differently from one control arm to the next such that the links of two adjacent control arms effectively point towards one another.

Each control arm 146 includes a first end 164 having a plurality of bosses 166 that are attached to support structure 142 by, for instance, welding. In the embodiment illustrated in FIGS. 9 and 9A, there are two pairs of bosses 166 for each control arm 146, and each pair of bosses 166 is designed to rotatably receive a bar 168 for rotation about an axis 170. Links M and N each are pivotably connected to a corresponding bar 168 at a pivot point 172, as best illustrated in FIG. 9. Bars 168 and pivot points 172 are designed to permit pivotable motion of links M and N with one degree of freedom.

Figure 9B:
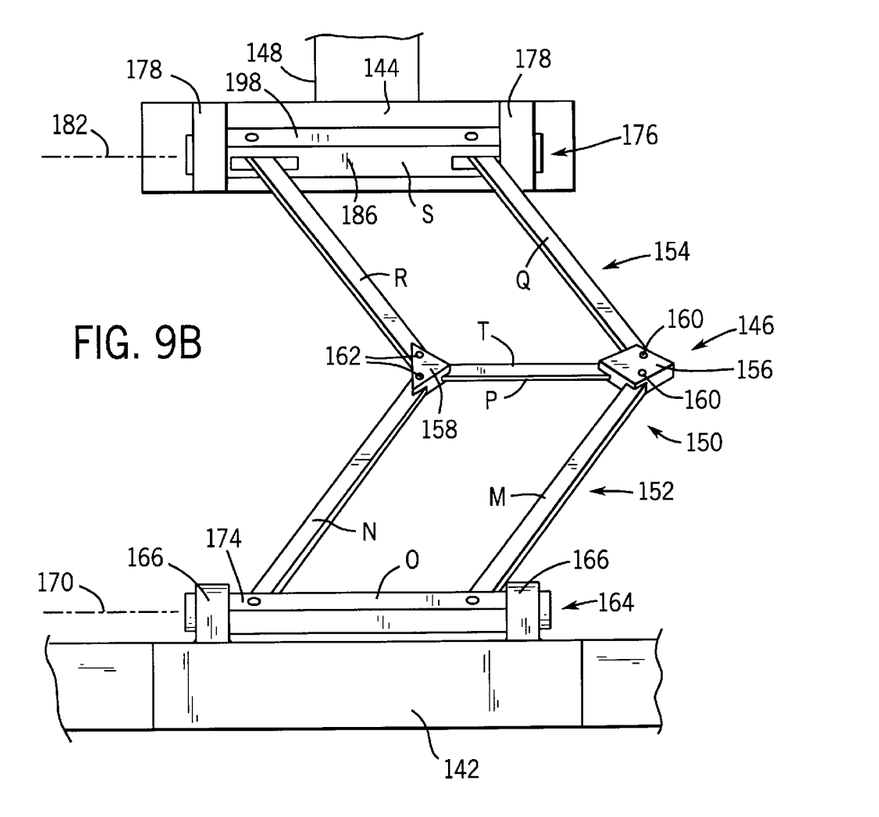
FIG. 9B illustrates a modified version of the embodiment illustrated in FIG. 9A.

In the modified embodiment illustrated in FIG. 9B, a single bar 174 is rotatably mounted within a single pair of bosses 166 for rotation about axis 170. In this embodiment, each link M and N is mounted to single bar 174 at its corresponding pivot point 172.

Similarly, each control arm 146 includes a second end 176 by which it is pivoably mounted to machine component 144. Second end 176 includes a plurality of bosses 178 that are affixed to machine component 144 by, for instance, welding. In the embodiment illustrated in FIGS. 9 and 9A, two pairs of bosses 178 are configured to rotatably receive two bars 180, as described with respect to first end 164. Each bar 180 is pivotably mounted to one pair of bosses 178 for rotation with a single degree of freedom about an axis 182. Further, each link Q and R is pivotably connected to a corresponding bar 180 for pivotable motion with one degree of freedom about a pivot point 184, similar to the arrangement described with reference to first end 164.

In the modified embodiment illustrated in FIG. 9B, bars 180 are replaced with a single bar 186 that extends between a single pair of bosses 178. In this embodiment, links Q and R are both pivotably connected to single bar 186 at pivot points 184.

The various links and control arms can be connected in a variety of ways. However, in the preferred embodiment, three control arms 146 are connected to support structure 142 at three unique locations, and to machine component 144 at three unique locations, as illustrated. This can be described best with reference to the top view in FIG. 9A. As illustrated, the three axes 170 lie generally parallel to a common plane to form a triangular shape 187 when viewed from the perspective of FIG. 9A. Similarly, the three axes 182 lie generally parallel to a common plane to form a triangular shape 188 when viewed from the perspective of FIG. 9A.

Also, the lengths traversed by links M and N between corresponding pivot points 160, 162 and 172 are equal. Similarly, the lengths traversed by links Q and R between corresponding pivot points 160, 162 and 184 are equal. The lengths spanned by links O, P and S, T are also substantially equal to one another. Thus, the links M and N of each first four bar linkage 152 remain parallel during movement of machine component 144 relative to support structure 142. Similarly, links Q and R of each second four bar linkage 154 remain parallel during movement of machine component 144 relative to support structure 142. Although the links potentially could have bowed shapes or other configurations, it is preferred that they extend directly between their corresponding connection points so torsional forces exerted against machine component 144 are absorbed solely in either tension or compression. In this preferred embodiment, links M and N extending between corresponding pivot points 160, 162 and 172 are equal in length and remain parallel to one another. Also, links Q and R, extending between their corresponding pivot points 160, 162 and 184 are substantially equal in length and remain parallel to one another.

Figure 9C:
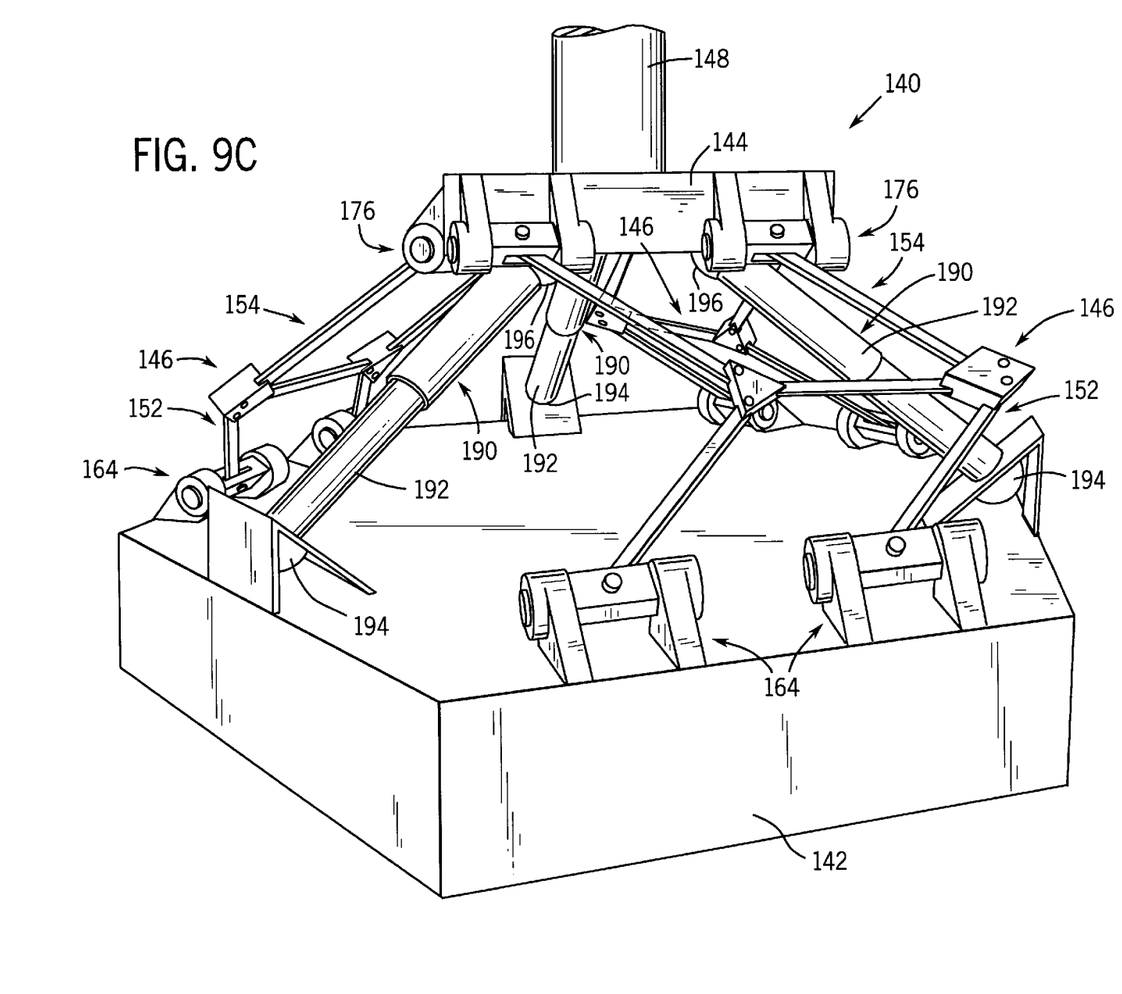
FIG. 9C illustrates the embodiment of FIG. 9 with the addition of a powered actuator mechanism.

As illustrated in FIG. 9C, three-axis control structure 140 can include an actuator 190 to move machine component 144 relative to support structure 142. Preferably, actuator 190 includes three linearly extensible actuator legs 192. Linearly extensible actuator legs 192 can comprise, for instance, ball screws, hydraulic cylinders or linear motors as described above with reference to the embodiment illustrated in FIG. 1.

Each linearly extensible actuator leg 192 may be pivotably connected to support structure 142 by a pivot mount 194 that permits at least two degrees of freedom of movement, e.g., by trunions or ball and socket type joints. Similarly, each linearly extensible actuator leg 192 is pivotably connected to machine component 144 by a pivot mount 196 that permits at least two degrees of freedom of motion, e.g., by a trunion or ball and socket type pivot. Actuator 190 permits machine component 144 and object 148 to be moved along a desired path, while control arms 146 restrict rotational movement of machine component 144 along the rotational axes a, b and c. It also should be noted that linearly extensible actuator legs 192 can be disposed in a variety of orientations. For example, each leg could be mounted substantially parallel with a corresponding control arm 146 either to the interior or to the exterior of the control arm.

Figure 9D:
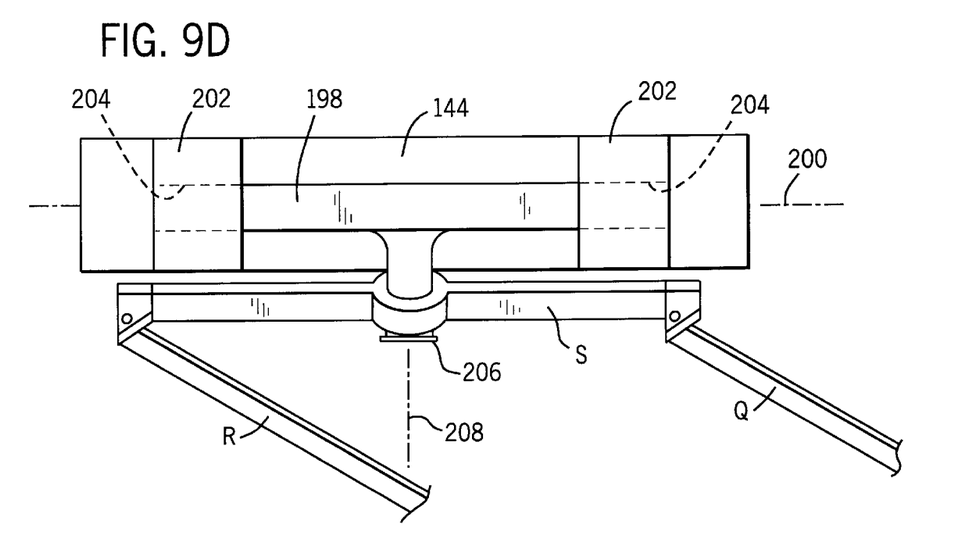
FIG. 9D illustrates another modified embodiment of the machine illustrated in FIG. 1.

Another embodiment for pivotably connecting each control arm 146 to either support structure 142 or machine component 144 is illustrated in FIG. 9D. To facilitate explanation, this method of attaching a control arm 146 will be described with reference to its attachment to machine component 144 only. However, this same method could be used to attach the control arm 146 to support structure 142.

As illustrated in FIG. 9D, a longitudinal member 198 can be rotatably mounted to machine component 144 for rotation with a single degree of freedom about an axis 200. For example, longitudinal member 198 could be rotatably mounted in a pair of bosses 202 that are affixed to machine component 144 and include a pair of openings 204 for receiving rounded ends of longitudinal member 198.

A mounting member 206 is attached to longitudinal member 198 and extends therefrom along an axis 208. Axis 208 is transverse to axis 200. A link S of second four bar linkage 154 is mounted to mounting member 206, such that it could pivot about axis 208. This can be accomplished by affixing link S to mounting member 206 and rotatably connecting mounting member 206 to longitudinal member 198. Alternatively, mounting member 206 can be affixed to longitudinal member 198 and link S can be mounted for pivotable motion about axis 208, as illustrated.

By connecting each control arm 146 to machine component 144 in the manner illustrated in FIG. 9D, the control arms still cooperate to provide rigid resistance to any torsional forces acting on machine component 144. This method of attachment works best when axis 208 is oriented to lie generally in the same plane through which links Q and R are allowed to pivot. In some applications, it may be advantageous to use this method of connecting control arm 146 to either machine component 144 or support structure 142.

It will be understood that the foregoing description is of preferred exemplary embodiments of this invention, and that the invention is not limited to the specific forms shown. For example, different types of actuator legs and actuators can be employed to move the machine component. A wide variety of pivot mounts can be used to connect the actuator legs and control arms between the machine component and the support structure. The design of the four-bar linkages and the type of pivot joints connecting the bars can vary depending on the application of the machine and the types of forces encountered by the machine component. Additionally, depending on operator preferences and the particular use of the machine, various control systems can be used to control movement of the machine component via the actuator. For example, specific controllers may work best with certain types of actuators or to control specific movements of the machine component, which can vary from a simple linear movement to complex movements through three dimensional space. These and other modifications may be made in the design and arrangement of the element without departing from the scope of the invention as expressed in the appended claims.

What is claimed:

1. A three-axis control structure that permits an object to move through space along the three linear axes while restricting motion of the object along the rotational axes, comprising:

a support structure;

a machine component configured to carry the object; and a rotational control system connected between the support structure and the machine component, the rotational control system including three control arms, each control arm having a pair of four-bar linkages connected in series such that the pair of four-bar linkages remain oriented generally parallel to a common plane during movement of the machine component, wherein the rotational control system restricts movement of the machine component along the rotational axes relative to the support structure.

2. The three-axis control structure as recited in claim 1, wherein each control arm is pivotably attached to the support structure for pivotable motion with one degree of freedom about a first corresponding axis.

3. The three-axis control structure as recited in claim 2, wherein each control arm is pivotably attached to the machine component for pivotable motion with one degree of freedom about a second corresponding axis.

4. The three-axis control structure as recited in claim 3, wherein the first corresponding axes all lie parallel to a first common plane.

5. The three-axis control structure as recited in claim 4, wherein the second corresponding axes all lie parallel to a second common plane.

6. The three-axis control structure as recited in claim 2, wherein there are three first axes that cross one another to form a generally triangular shape.

7. The three-axis control structure as recited in claim 3, wherein there are three second axes that cross one another to form a generally triangular shape.

8. The three-axis control structure as recited in claim 1, wherein the three control arms extend radially outward towards the support structure.

9. The three-axis control structure as recited in claim 1, wherein each four-bar linkage includes two equal-length links connected such that the equal-length links remain parallel during movement of the machine component relative to the support structure.

10. The three-axis control structure as recited in claim 1, further comprising an actuator connected between the machine component and the support structure to move the machine component relative to the support structure.

11. The three-axis control structure as recited in claim 10, wherein the actuator includes three linearly extensible actuator legs.

12. A control structure that permits an object to move through space along the three linear axes while restricting motion of the object along the rotational axes, comprising:
a support structure;
a machine component configured to carry the object; and
a plurality of control arms connected between the support structure and the machine component, each control arm including links arranged as serially connected four-bar linkages to restrict movement of the machine component along the rotational axes, solely through tension and compression of the links, the serially connected four-bar linkages of each control arm remaining oriented generally parallel to a common plane during movement of the machine component.

13. The control structure as recited in claim 12, wherein the plurality of control arms includes three control arms arranged to restrict movement of the machine component along the three rotational axes.

14. The control structure as recited in claim 12, further comprising an actuator disposed to move the machine component relative to the support structure.

15. The control structure as recited in claim 14, wherein the actuator includes three linearly extensible actuators, each linearly extensible actuator having a first and pivotably connected to the support structure.

16. The control structure as recited in claim 12, wherein each control arm is pivotably connected at one end to the machine structure for pivotable motion with one degree of freedom and is pivotably connected at its other end to the support structure for pivotable motion with one degree of freedom, further wherein each control arm includes a pair of four-bar linkages connected in series.

17. The control structure as recited in claim 16, wherein each four-bar linkage includes at least two equal length links that remain parallel during movement of the machine component relative to the support structure.

18. A method for preventing undesired movement of a machine component along the rotational axes when moved relative to a support structure, comprising the steps of:
providing a support structure;
providing a machine component;
pivotably connecting a series of links, to form a pair of four-bar linkages arranged in series;
restricting each four-bar linkage to one degree of freedom of movement with respect to the other, such that the pair of four-bar linkages remain generally parallel to a common plane during movement of the machine component:
mounting an actuator to move the machine component relative to the support structure; and
connecting the series of links between the support structure and the machine component such that the machine component can move along the three linear axes but is restricted from movement along at least one of the rotational axes.

19. The method as recited in claim 18, wherein the step of mounting includes mounting a plurality of linear actuators between the machine component and the support structure to move the machine component relative to the support structure.

20. The method as recited in claim 18, further comprising the steps of:
arranging the series of links into three control arms with each control arm including a pair of four-bar linkages connected in series.

* * * * *